United States Patent [19]

Zdeb

[11] 4,412,573
[45] Nov. 1, 1983

[54] INJECTION SITE

[75] Inventor: Brian D. Zdeb, Round Lake Park, Ill.

[73] Assignee: Baxter Travenol Laboratories, Inc., Deerfield, Ill.

[21] Appl. No.: 335,133

[22] Filed: Dec. 28, 1981

[51] Int. Cl.³ ............................................. B65D 41/50
[52] U.S. Cl. ................................... 604/415; 215/247; 604/408
[58] Field of Search ............................. 215/247; 150/8

[56] References Cited

U.S. PATENT DOCUMENTS

| | | |
|---|---|---|
| 221,491 | 11/1879 | Anderson . |
| 415,507 | 11/1889 | Hazlehurst et al. . |
| 586,038 | 7/1897 | Hope . |
| 924,230 | 6/1909 | Horne . |
| 2,135,386 | 11/1936 | Crabbe . |
| 2,687,731 | 8/1954 | Iarussi . |
| 3,030,955 | 4/1962 | Gossett ................................ 150/8 X |
| 3,101,863 | 8/1963 | Jackson ................................ 215/247 |
| 3,694,894 | 10/1972 | Jelinek et al. . |
| 3,793,699 | 2/1974 | Merola . |
| 3,981,066 | 9/1976 | Calvert . |
| 4,133,441 | 1/1979 | Mittleman et al. . |
| 4,187,893 | 2/1980 | Bujan ....................................... 150/8 |
| 4,219,912 | 9/1980 | Adams . |
| 4,279,352 | 7/1981 | Ward . |
| 4,294,249 | 10/1981 | Sheehan et al. . |
| 4,301,590 | 11/1981 | Ward . |
| 4,303,067 | 12/1981 | Connolly et al. . |
| 4,307,766 | 12/1981 | Tanokura . |

Primary Examiner—Donald F. Norton
Attorney, Agent, or Firm—Paul C. Flattery; John P. Kirby, Jr.; Bradford R. L. Price

[57] ABSTRACT

An improved injection site (18) for a medical fluid container (10) is provided, along with a procedure facilitating the automated assembly of the injection site (18). An oversized, compressible situs (22) is retained in compressive relation to a generally tubular port (20) in a manner which makes inadvertent removal of the situs (22) virtually impossible.

21 Claims, 5 Drawing Figures

INJECTION SITE

DESCRIPTION

TECHNICAL FIELD

The present invention relates to cannula-pierceable injection sites, and in particular, to a needle-pierceable injection site for a medical fluid container.

BACKGROUND OF THE INVENTION

Medical fluid containers frequently include an injection site to enable the addition of a medicament to the medical fluid. In order to maintain the sterility of the fluid which may be, for example, a dextrose solution or saline solution, the injection site should be self-sealing so that after the injection site is pierced by a needle and the needle withdrawn, container-external contaminants cannot enter the container through the injection site.

It is known to provide an injection site which includes a thin plastic membrane above which is mounted a rubber-like piece. A needle may pierce the rubber-like piece and membrane in one motion. After the needle is withdrawn, the rubber-like piece self-seals, i.e., it closes over the opening made by the needle. The rubber-like piece prevents any liquid in the container from exiting through the hole in the membrane and prevents contaminants from entering the container through the membrane.

Frequently, the rubber-like portion is frictionally mounted in and about a cylindrical tube. It has been found that the rubber-like portion is subject to accidental removal, especially after repeated injections by a needle. Accidental removal of the rubber-like portion increases the chances of contamination of the parenteral fluid. To lessen the chance of accidental removal a heat shrink band is commonly placed about the portion of the rubber-like piece that surrounds the exterior of the cylinder. Such injection sites are relatively expensive to manufacture, sometimes requiring manual assembly. Such construction also makes necessary the careful positioning of an injecting needle because part of the rubber-like portion is directly above or outside of the cylindrical tube. Medical personnel must ensure that the needle pierces the rubber-like portion in the center portion within the tube.

The present invention virtually eliminates the chance of inadvertent removal of the rubber-like portion of the injection site, enhances the self-sealing characteristics of the injection site, presents an easy target for injection and is capable of automated assembly.

SUMMARY OF THE INVENTION

The present invention is directed to a safer, less expensive injection site which is capable of automated assembly. The method of the invention provides means for such automated assembly.

More particularly, an oversized compressible situs is mounted in a generally tubular port which includes a membrane. The top of the tubular port is preferably tapered inwardly such that the opening defined by the tapered top end has a diameter less than the diameter of the volume defined by the tubular port. The situs is maintained in a state of compression within the tubular port. Preferably, the situs is spherically shaped. The compression of the situs maintained by the tubular port prevents removal of the situs upon removal of an inserted needle. The tubular port almost totally encloses the situs except for an arcuate surface of the situs projecting through the defined opening of the tubular port. The protection provided by the tubular port and the state of compression of the situs make inadvertent removal of the situs virtually impossible. Additionally, it is believed that the self-sealing quality of the situs is improved by maintaining same in a state of compression.

The construction of the injection site of the present invention has the additional advantage of presenting a clear target for injection. That portion of the situs which projects beyond the tubular port is entirely above the inside of the port. Thus, medical personnel need not check whether the correct part of the situs has been pierced.

The injection site of the invention is capable of automated assembly by the use of a unique motion imparted to the situs during insertion and the application of at least a partial vacuum to the volume defined by the tubular port so that the situs, although considerably larger than the defined volume, may be securely assembled into the tubular port.

DETAILED DESCRIPTION OF THE PREFERRED EMBODIMENT

Figure 1:
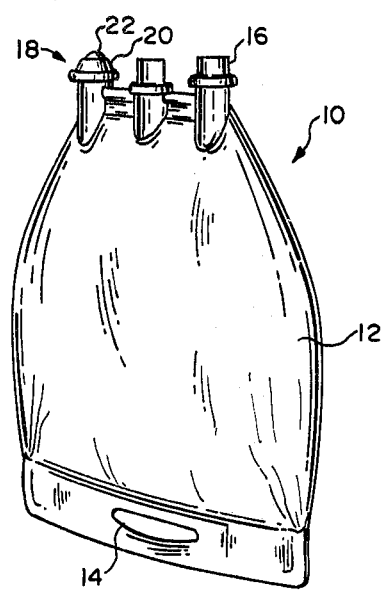
FIG. 1 is a perspective view of a medical fluid container including the injection site of the present invention.

FIG. 1 illustrates a flexible medical fluid container 10 including a container wall 12. The container 10 shown includes flexible plastic walls; however, any suitable container may be used, such as a glass container. The container 10 may include a slit 14 for suspending the container. The container 10 includes an administration port 16 and an injection site 18. The injection site 18 includes a generally tubular port 20 and a situs 22.

Figure 2:
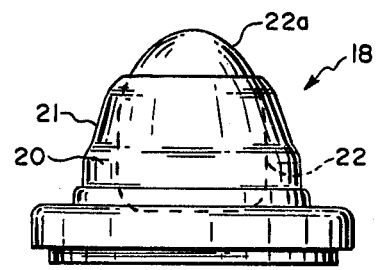
FIG. 2 is a side elevational view of the injection site.
Figure 3:
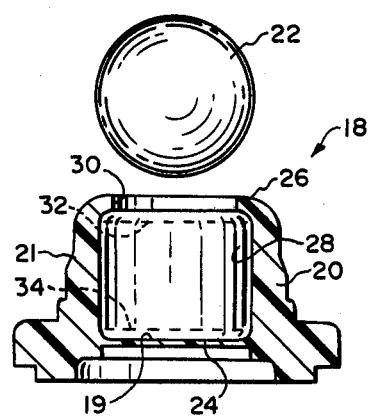
FIG. 3 is an exploded view of the injection site in partial section.
Figure 4:
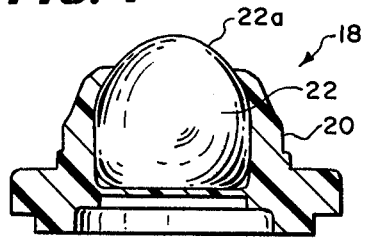
FIG. 4 is a cross-sectional view of the injection site.

FIGS. 2 through 4 illustrate the injection site 18 in greater detail. A generally tubular port 20 has an exterior surface 21 and a base end 19 defined by a relatively thin membrane 24. In the preferred embodiment the generally tubular port 20 is injection molded from an appropriate plastic, such as polypropylene. The generally tubular port 20 includes a top end 26 which is preferably tapered inwardly. The generally tubular port 20 may be constructed as part of a larger assembly or as shown in the drawing, made separately and attached to the container 10 by the use of adhesive, radio frequency sealing or other suitable means. The port 20 defines a volume 28. The top end 26 defines a preferably substantially circular opening 30 to the defined volume 28.

A needle-pierceable situs 22 is mounted within the defined volume 28 of the port 20. The situs must be of a compressible material such as polyisoprene. The situs 22 must also have a tendency to self-seal and must be resistant to coring by a needle. As seen best in FIG. 3, the diameter of the situs 22 in its premounted, unstressed state is greater than the diameter of the defined volume as measured immediately below the top end 26, the latter diameter being illustrated by phantom line 32. As seen in FIGS. 1, 2 and 4, the situs 22 is free of any contact with the exterior surface 21 of the tubular port 20.

In one embodiment of the invention the diameter of the situs, when unstressed, is between about 0.24 and 0.26 in. The diameter 32 of the defined volume 28 immediately below the top end 26 is about 0.23 in. The defined volume 28 below the top end 26 is substantially cylindrical, having a diameter 34 at the base end 19 which is between about 0.21 and 0.22 in. The height of the generally tubular port 20 from the membrane 24 through the top end 26 is between about 0.22 and 0.24 in. The diameter of the circular opening 30 is about 0.19 in. These dimensions are given as an example only and are not intended to limit the present invention. In this example, the diameter of the situs 22, when unstressed, is between about 4% and 16% larger than the height of the tubular port and between about 6% and 14% larger than the largest diameter of the volume defined by the generally tubular port 20. It is believed that the present invention will function with size ratios much different than cited above; however, such testing has not been performed.

As seen best in FIGS. 2 and 4, the situs 22 is in compressive sealing relation to the generally tubular port. The compressed situs conforms substantially in shape to the defined volume 28. The situs 22 and port 20 are dimensioned so that a portion 22a of the situs projects beyond the top end 26 of the port 20, providing an easily accessible injection site. The portion 22a has a generally arcuate surface. Because of the compression seal between the situs 22 and the port 20, the situs 22 is virtually impossible to remove accidently. Two other design features which inhibit inadvertent separation of the situs from the port relate to the structure of the port itself. First, the present invention is directed to a seal entirely within, as opposed to partially outside of, the port 20. No frictional or other contact between the situs 22 and the exterior surface 21 of the tubular port 20 is necessary. The port 20 can thus be made to surround all but the portion 22a, providing further protection to the situs 20. Second, while it is believed that the present invention may be made by providing a straight cylindrical port 20, the inwardly tapered top end 26 further inhibits withdrawal of the compressed situs 22, even after repeated injections by a needle.

Figure 5:
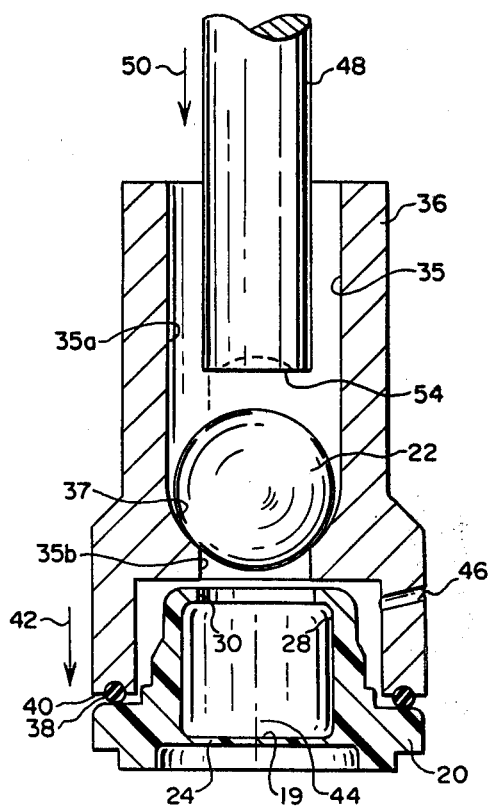
FIG. 5 is a side elevational view of apparatus for assembly of the injection site, in partial section.

The oversized situs 22 greatly contributes to the benefits of the present invention; but it also poses a problem in assembly. A method of assembling the situs 22 and port 20 has been discovered, however, and is best shown in FIG. 5, illustrating an automated assembly procedure. The port 20 is placed on a level surface (not shown). The situs 22 is temporarily mounted in a channel 35 within a cylinder apparatus 36. The channel 35 includes an enlarged upper portion 35a having a diameter greater than the diameter of the situs 22 and a lower portion 35b less than the diameter of the situs 22 but preferably not less than that of the circular opening 30 in the port 20. The situs 22 rests on a ledge 37 intermediate the upper and lower portions 35a, 35b of the channel 35. The cylinder apparatus 36 with the situs 22 therein is lowered over the port 20 such that an O-ring 38 mounted at the port end 40 of the cylinder apparatus 36 contacts the port 20. The direction of movement of the cylinder apparatus 36 is indicated by an arrow 42.

The situs and the tubular port are thus placed in registration. The center of the situs 22 is aligned with the central axis 44 of the tubular port 20 so that the center of the situs 22 and the open top end 26 of the port 20 are in spaced relation. A partial vacuum is applied to the defined volume 28 from a source exterior of the cylinder apparatus 36, through passageway 46.

A push rod 48 is then lowered into the channel 35, as indicated by an arrow 50. Additionally, the push rod 48 rotates as indicated by the arrow 52 simultaneously with the lowering motion indicated by the arrow 50. The push rod 48 includes a hemispherical head 54 which conforms generally to the surface of the situs 22. The downward motion 50 of the push rod 48 forces the situs 22 through the lower portion 35b of the channel 35 into the defined volume 28. The twisting motion 52 of the push rod 48 is imparted to the situs 22, considerably facilitating the assembly procedure.

Also, because of the relative sizes of defined volume 28 and situs 22, the applied partial vacuum has been found to facilitate both an automated assembly as well as a proper fit between the situs 22 and port 20, enabling the situs 22 to be inserted far enough to engage the membrane 24. After assembly the applied vacuum is interrupted and the assembled injection site 18 is removed from the cylinder apparatus 36.

Different methods of assembly are possible. For instance, instead of employing an applied vacuum, an appropriate air vent structure such as a small cylindrical rigid tube (not shown) may be inserted into the defined volume at the side of the circular opening 30. The situs 22 is then pushed through the circular opening 30 past the air vent structure, pushing air out of the defined volume through the air vent. The air vent structure may then be removed.

While one embodiment of the device and method of the present invention has been described in detail and shown in the accompanying drawing, and other embodiments have also been suggested, it will be evident that various further modifications are possible without departing from the scope of the invention.

What is claimed is:

1. A needle-pierceable injection site comprising:
   a generally tubular port including a base end and a top end;
   a needle-pierceable membrane extending across and closing said base end;
   said generally tubular port and needle-pierceable membrane defining a volume, said top end defining a substantially circular opening to said defined volume; and
   a needle-pierceable compressed situs of self-sealing material having the form of a sphere in its unstressed state, disposed in said generally tubular port and retained in compressive sealing relation thereto.

2. The injection site as in claim 1, wherein said compressed situs includes a portion which projects beyond said top end.

3. The injection site as in claim 2, wherein said portion has an arcuate surface.

4. The injection site as in claim 2, wherein said compressed situs is free of any contact with an exterior surface of said generally tubular port.

5. The injection site as in claim 4, wherein said compressed situs conforms substantially in shaped to said defined volume.

6. The injection site as in claim 5, wherein said top end tapers inwardly so that the substantially circular opening has a diameter less than the diameter of said defined volume, as measured immediately below said top end, said tapered top end further maintaining said compressed situs and said generally tubular port in compressive sealing relation and inhibiting removal of said compressed situs from said tubular port.

7. The injection site as in claim 6, wherein said compressed situs comprises a polyisoprene material.

8. The injection site as in claim 6, wherein said generally tubular port is made from an injection-moldable plastic.

9. The injection site as in claim 8, wherein said generally tubular port comprises a polypropylene material.

10. The injection site as in claim 6, wherein said defined volume between said top end and said base end is substantially cylindrical.

11. The injection site as in claim 10, wherein the diameter of said compressed situs, when unstressed, is between about 4% and 16% larger than the height of said tubular port measured from said membrane to said top end.

12. The injection site as in claim 10, wherein the diameter of the circular opening is about 0.19 in., the diameter of said defined volume immediately below said top end is about 0.23 in. and the diameter of said compressed situs, when unstressed, is between about 0.24 in. and 0.26 in.

13. The injection site as in claim 12, wherein the height of said generally tubular port from said membrane through said top end, is between about 0.22 in. and 0.24 in.

14. The injection site as in claim 10, wherein the diameter of said situs, when unstressed, is between about 6% and 14% larger than a largest diameter of the volume defined by said generally tubular port.

15. A needle-pierceable injection site for a medical fluid container comprising:
a generally tubular port including a base end and a top end;
a needle-pierceable membrane extending across and closing said base end;
said generally tubular port and needle-pierceable membrane defining a volume, said top end defining a substantially circular opening to said defined volume; and
a needle-pierceable compressed situs of self-sealing material having the form of a sphere in its unstressed state, disposed in said generally tubular port and retained in compressive sealing relation thereto.

16. A needle-pierceable injection site comprising:
a generally tubular port including a base end and a top end;
a needle-pierceable membrane extending across and closing said base end;
said generally tubular port and needle-pierceable membrane defining a volume, said top end defining a substantially circular opening to said defined volume; and
a needle-pierceable compressed situs of self-sealing material having the form of a sphere in its unstressed state, disposed in said generally tubular port, said situs conforming substantially in shape to said defined volume and being retained in compressive sealing relation to said tubular port, said compressed situs further including a portion which projects beyond said top end, said compressed situs being free of any contact with an exterior surface of said generally tubular port.

17. A needle-pierceable injection site comprising:
a generally tubular port including a base end and a top end;
a needle-pierceable membrane extending across and closing said base end;
said generaly tubular port and needle-pierceable membrane defining a volume which is substantially cylindrical between said top and base ends, said top end defining a substantially circular opening to said defined volume and tapering inwardly so that the substantially circular opening has a diameter less than the diameter of said defined volume, as measured immediately below said top end; and
a needle-pierceable compressed situs of self-sealing material having the form of a sphere in its unstressed state, said compressed situs including a portion which projects beyond said top end, said compressed situs being free of any contact with an exterior surface of said generally tubular port, conforming substantially in shape to said defined volume and being retained in compressive sealing relation to said generally tubular port;
said tapered top end further maintaining said compressed situs and said generally tubular port in compressive sealing relation and inhibiting removal of said compressed situs from said tubular port.

18. The injection site as in claim 17, wherein the diameter of said compressed situs, when unstressed, is between about 4% and 16% larger than the height of said tubular port measured from said membrane to said top end.

19. The injection site as in claim 17, wherein the diameter of the circular opening is about 0.19 in., the diameter of said defined volume immediately below said top end is about 0.23 in. and the diameter of said compressed situs, when unstressed, is between about 0.24 in and 0.26 in.

20. The injection site as in claim 19, wherein the height of said generally tubular port from said membrane through said top end, is between about 0.22 in. and 0.24 in.

21. The injection site as in claim 17, wherein the diameter of said situs, when unstressed, is between about 6% and 14% larger than a largest diameter of the volume defined by said generally tubular port.

* * * * *

REEXAMINATION CERTIFICATE (406th)

United States Patent [19]

Zdeb

[11] B1 4,412,573

[45] Certificate Issued Oct. 22, 1985

[54] INJECTION SITE

[75] Inventor: Brian D. Zdeb, Round Lake Park, Ill.

[73] Assignee: Baxter Travenol Laboratories, Inc., Deerfield, Ill.

Reexamination Request:
No. 90/000,730, Feb. 25, 1985

Reexamination Certificate for:
Patent No.: 4,412,573
Issued: Nov. 1, 1983
Appl. No.: 335,133
Filed: Dec. 28, 1981

[51] Int. Cl.⁴ ............................................. B65D 41/50
[52] U.S. Cl. .................................... 604/415; 215/247; 604/408
[58] Field of Search ............... 215/247; 604/408, 415

[56] References Cited

U.S. PATENT DOCUMENTS

| | | | |
|---|---|---|---|
| 2,183,900 | 12/1939 | Voit | 273/65 |
| 2,388,634 | 11/1945 | De Woody | 128/272 |
| 2,393,578 | 1/1946 | Waite | 215/38 |
| 2,415,871 | 2/1947 | De Woody | 128/272 |
| 2,838,046 | 6/1958 | Butler | 128/272 |
| 3,030,955 | 4/1962 | Gossett | 383/9 |
| 3,081,029 | 3/1963 | Gauslaa | 233/26 |
| 3,101,863 | 8/1963 | Jackson | 215/247 |
| 3,685,680 | 8/1972 | Tenckhoff et al. | 220/27 |
| 3,762,023 | 10/1973 | Bruce | 29/400 |
| 3,900,028 | 8/1975 | McPhee | 128/272 |
| 3,959,061 | 5/1976 | Renck et al. | 156/262 |
| 4,133,441 | 1/1979 | Mittleman | 215/247 |
| 4,140,411 | 2/1979 | Harbauer et al. | 401/213 |
| 4,187,893 | 2/1980 | Bujan | 215/247 X |
| 4,204,604 | 5/1980 | Morin et al. | 215/257 |
| 4,207,988 | 6/1980 | Prouty et al. | 215/232 |
| 4,259,184 | 3/1981 | D'Arnal | 210/85 |
| 4,267,835 | 5/1981 | Barger et al. | 128/214 |
| 4,307,766 | 12/1981 | Tanokura | 215/247 X |
| 4,308,654 | 1/1982 | Bogart | 29/451 |
| 4,439,192 | 3/1984 | Leurink | 604/408 |
| 4,496,362 | 1/1985 | Leurink | 604/408 |

FOREIGN PATENT DOCUMENTS 2805354 9/1978 Fed. Rep. of Germany .

*Primary Examiner*—Donald F. Norton

[57] ABSTRACT

An improved injection site (18) for a medical fluid container (10) is provided, along with a procedure facilitating the automated assembly of the injection site (18). An oversized, compressible situs (22) is retained in compressive relation to a generally tubular port (20) in a manner which makes inadvertent removal of the situs (22) virtually impossible.

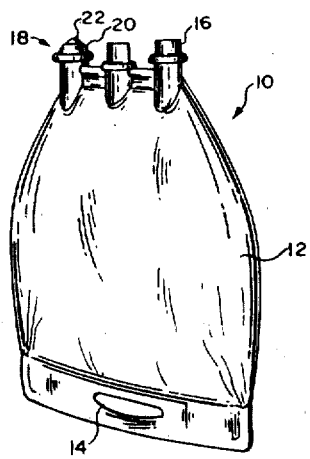

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–21 is confirmed.

New claims 22–29 are added and determined to be patentable.

*22. A needle-pierceable injection site comprising:*
*a generally tubular port including a base end and a top end;*
*a needle-pierceable membrane extending across and closing said base end;*
*said generally tubular port and needle-pierceable membrane defining a volume, said top end defining a substantially circular opening to said defined volume; and*
*a needle-pierceable compressed situs of self-sealing material having the form of a sphere in its unstressed state and oversized with respect to said defined volume, disposed in said generally tubular port and thereby retained in compressive sealing relation thereto by virtue of being oversized.*

*23. The injection site as in claim 22, wherein said top end tapers inwardly so that the substantially circular opening has a diameter less than the diameter of said defined volume, as measured immediately below said top end, said tapered top end further maintaining said compressed situs and said generally tubular port in compressive sealing relation and inhibiting removal of said compressed situs from said tubular port.*

*24. The injection site as in claim 22, wherein said defined volume between said top end and said base end is substantially cylindrical.*

*25. The injection site as in claim 22, wherein the diameter of said compressed situs, when unstressed, is between about 4% and 16% larger than the height of said tubular port measured from said membrane to said top end.*

*26. The injection site as in claim 24, wherein the diameter of said situs, when unstressed, is between about 6% and 14% larger than a largest diameter of the volume defined by said generally tubular port.*

*27. A needle-pierceable injection site for a medical fluid container comprising:*
*a generally tubular port including a base end and a top end;*
*a needle-pierceable membrane extending across and closing said base end;*
*said generally tubular port and needle-pierceable membrane defining a volume, said top end defining a substantially circular opening to said defined volume; and*
*a needle-pierceable compressed situs of self-sealing material having the form of a sphere in its unstressed state and oversized with respect to said defined volume, disposed in said generally tubular port and thereby retained in compressive sealing relation thereto by virtue of being oversized.*

*28. A needle-pierceable injection site comprising:*
*a generally tubular port including a base end and a top end;*
*a needle-pierceable membrane extending across and closing said base end;*
*said generally tubular port and needle-pierceable membrane defining a volume, said top end defining a substantially circular opening to said defined volume; and*
*a needle-pierceable compressed situs of self-sealing material having the form of a sphere in its unstressed state and oversized with respect to said defined volume, disposed in said generally tubular port, said situs conforming substantially in shape to said defined volume and being retained in compressive sealing relation to said tubular port by virtue of being oversized, said compressed situs further including a portion which projects beyond said top end, said compressed situs being free of any contact with an exterior surface of said generally tubular port.*

*29. A needle-pierceable injection site comprising:*
*a generally tubular port including a base end and a top end;*
*a needle-pierceable membrane extending across and closing said base end;*
*said generally tubular port and needle-pierceable membrane defining a volume which is substantially cylindrical between said top and base ends, said top end defining a substantially circular opening to said defined volume and tapering inwardly so that the substantially circular opening has a diameter less than the diameter of said defined volume, as measured immediately below said top end; and*
*a needle-pierceable compressed situs of self-sealing material having the form of a sphere in its unstressed state and oversized with respect to said defined volume, said compressed situs including a portion which projects beyond said top end, said compressed situs being free of any contact with an exterior surface of said generally tubular port, conforming substantially in shape to said defined volume and being retained in compressive sealing relation to said generally tubular port by virtue of being oversized;*
*said tapered top end further maintaining said compressed situs and said generally tubular port in compressive sealing relation and inhibiting removal of said compressed situs from said tubular port.*

* * * * *